US006153994A

United States Patent [19]

Royer et al.

[11] Patent Number: 6,153,994

[45] Date of Patent: Nov. 28, 2000

[54] CONTROL CONSOLE

[75] Inventors: Philippe Royer, Le Moustoir; Christian Royer, Le Bono, both of France

[73] Assignee: Innova Son, Plougoumelen, France

[21] Appl. No.: 09/284,607

[22] PCT Filed: Oct. 17, 1997

[86] PCT No.: PCT/FR97/01864

§ 371 Date: May 6, 1999

§ 102(e) Date: May 6, 1999

[87] PCT Pub. No.: WO98/18119

PCT Pub. Date: Apr. 30, 1998

[30] Foreign Application Priority Data

Oct. 18, 1996 [FR] France .................................. 96 12684

[51] Int. Cl.[7] ...................................................... G05B 1/06

[52] U.S. Cl. .......................... 318/466; 318/652; 381/119

[58] Field of Search ..................................... 318/628, 652, 318/466; 340/407.1, 407.2; 116/DIG. 17; 200/521; 381/104, 106, 108, 119

[56] References Cited

U.S. PATENT DOCUMENTS

| | | | |
|---|---|---|---|
| 3,497,668 | 2/1970 | Hirsch . | |
| 3,919,691 | 11/1975 | Noll . | |
| 4,392,187 | 7/1983 | Burnhorst | 362/233 |
| 4,694,725 | 9/1987 | Seevers et al. | 84/1.27 |
| 5,189,355 | 2/1993 | Larkins et al. . | |
| 5,296,871 | 3/1994 | Paley . | |
| 5,346,046 | 9/1994 | Peters | 192/142 |
| 5,414,337 | 5/1995 | Schuler . | |
| 5,451,924 | 9/1995 | Massimino et al. . | |
| 5,623,551 | 4/1997 | East et al. | 381/119 |
| 5,940,521 | 8/1999 | East et al. | 381/119 |

FOREIGN PATENT DOCUMENTS

| | | |
|---|---|---|
| 0 323 878 | 7/1989 | European Pat. Off. . |
| 0 677 933 | 10/1995 | European Pat. Off. . |
| WO 89/01725 | 2/1989 | WIPO . |

*Primary Examiner*—Paul Ip
*Assistant Examiner*—Rina I. Duda
*Attorney, Agent, or Firm*—Young & Thompson

[57] ABSTRACT

A control console comprising at least one member (1) for adjusting the level of radio-electric signals capable of taking up any position between two extreme positions, elements for detecting the instantaneous position of the member and elements for memorizing at least one position of the member. This console is characterized in that each adjusting member is provided with both motor mechanism for automatically positioning the adjusting member in its memorized position corresponding to a status of adjustment selected by the user and tactile elements for signalling the deviation ratio of the adjusting member relative to its predetermined memorized position. The invention is useful for mixing or lighting consoles.

11 Claims, 1 Drawing Sheet

CONTROL CONSOLE

CROSS REFERENCE TO RELATED APPLICATION

This is the 35 USC §371 National Stage of International application PCT/FR97/01864 filed on Oct. 17, 1997, which designated the United States of America.

FIELD OF THE INVENTION

The present invention relates generally to a control console of the type comprising at least one adjustment member for the radio-electric signal levels, such as a cursor, a button, a key, this member being adapted to be actuated manually by the user to be able to occupy any position between two end positions, detection means for the instantaneous position of said adjustment member, and means for memorizing at least one position of said member corresponding to an adjustment condition selected by the user.

The present invention relates more particularly to mixing consoles or lighting control consoles.

BACKGROUND OF THE INVENTION

Mixing consoles at present can be divided into two groups:

- conventional consoles that are totally manual, in which the user must note manually the adjustments that it is desired to memorize,
- consoles with a memory which, thanks to an associated computer, can record and retrieve the different adjustment conditions that the user chooses.

The adjustment members most frequently used on a console are "faders" or cursors which move along a guide path between two end positions, these cursors permitting adjustment of the different levels of the different internal stages of the console.

The mixing consoles with a memory are provided with power driven cursors permitting the user to use by automatic positioning the different cursors in positions previously recorded in a memory of the computer type. In addition to this manner of automatic operation in which the cursors are automatically repositioned to memorized positions, such a console is capable of operating in a so-called manual or free mode in which the user can intervene manually from a mixing memory on the different positions of the different cursors of his console. The problem encountered by the user in the case of operation in the manual mode of the console is to be able to reposition rapidly his cursor to the memorized position without passing through the automatic operation mode. To solve this problem, consoles provided with cursors each provided with an indication of the luminous type, have been developed. The user can thus, by visual control of the position of these cursors, replace said cursors in their reference positions. However, such means require the user to be attentive to these luminous indications in the case in which a manual override of the adjustments is necessary. Such a constraint is adapted to degrade the quality of the work performed by the user.

Correspondingly, there are known adjustment members of the radio-electric signal level, provided with tactical signalization means as described in EP-A-0 677 933. In this case, the adjustment member is actuated by means of a rotatable member provided with an incremental transmitter and an electrically actuable brake, this brake generating a tactile signal on the rotatable member when the control member no longer occupies a predetermined position. As a result, such a device has for its object to manage the manual displacement of the control member to permit the user to modify rapidly his command, but does not permit in any case refining an adjustment that has been automatically made.

U.S. Pat. No. 5,414,337 describes an actuator comprising tactile means for the position of the actuator, these tactile means being reprogrammable electronically so as easily to modify the tactile signals supplied during a manual actuation of said actuator. Again, there is not in this actuator means to automatically pre-position the actuator.

SUMMARY OF THE INVENTION

The object of the present invention is therefore to overcome the mentioned drawbacks by providing a console whose manual adjustments carried out by the user are facilitated so as to recover very quickly the memorized reference position of said cursor without at the same time requiring the user to look at his console.

Another object of the present invention is to provide a console whose adjustment members can as desired be manually controlled or automatically controlled as to displacement, the manual control having for its principal object to refine the automatic adjustment carried out.

To this end, the invention has for its object a console of the control type comprising at least one adjustment member for the radio-electric signal level, such as a cursor, a button, a key, this member being adapted to be actuated manually by the user in order to occupy any position between two end positions, detection means for the instantaneous position of said adjustment member, and means for memorizing at least one position of said member corresponding to a condition of adjustment selected by the user, characterized in that each adjustment member is provided both with motor means for automatically positioning the adjustment member to its memorized position corresponding to a condition of adjustment selected by the user, and tactile means for signalling the spacing between said adjustment member relative to its predetermined memorized position.

Thus equipped, the adjustment member is easy to position or to reposition without risk of errors for the user.

In a first embodiment of the invention, the tactile signalization means for the spacing of the adjustment member relative to its memorized predetermined position, comprise motor means for automatically positioning the adjustment member to its memorized position corresponding to a condition of adjustment selected by the user. In other words, in this case, the tactile signalization means are constituted, in addition to the adjustment member, by the motor member which is used as a means to automatically position the adjustment member. As a result, a simple and economical design for the tactile signalization means due to an optimum use of the motor means for automatically positioning the adjustment member, is achieved.

In a second embodiment of the invention, which can be considered more complicated, the control console is characterized in that the motor means for automatically positioning the adjustment member to its memorized predetermined position, and the tactile means for signalling spacing of said adjustment member relative to its predetermined memorized position, are different.

BRIEF DESCRIPTION OF THE DRAWINGS

The invention will be better understood from a reading of the following description of one embodiment, with reference to the signal figure which represents an operational diagram of a portion of the elements of a console according to the invention.

DETAILED DESCRIPTION OF THE INVENTION

Figure 1:
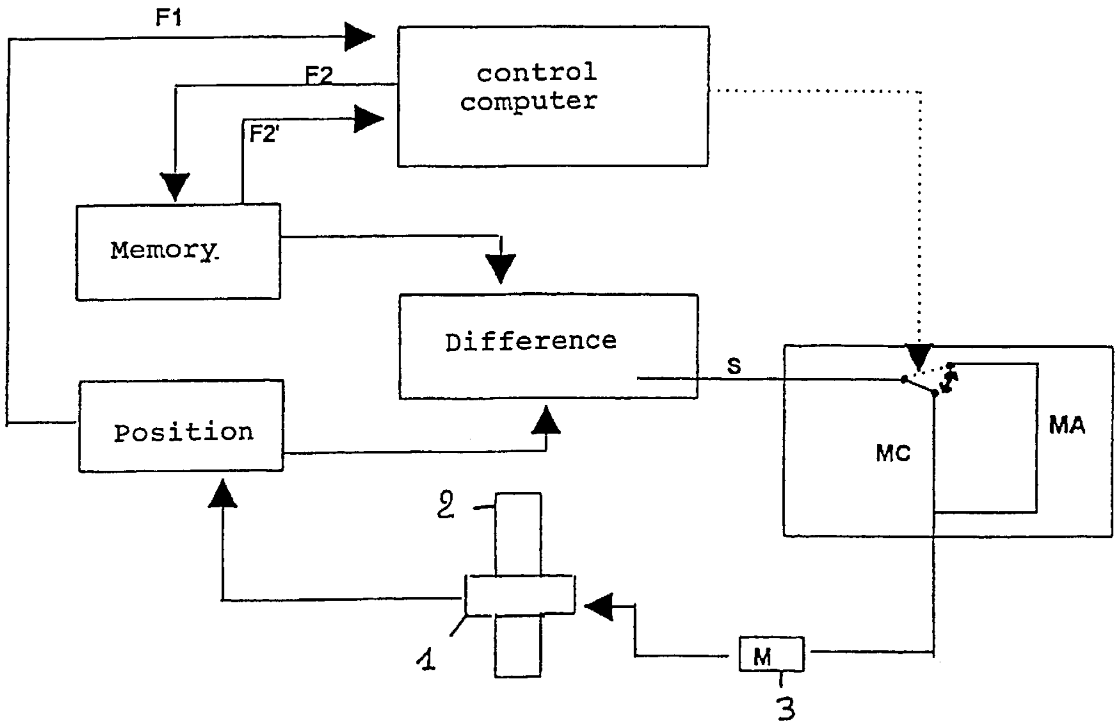

The following description is applicable more particularly to a mixing console, although the characteristics described could be applied to any other type of control console.

The mixing console with memories, which is the object of the invention, comprises at least one member 1 for the adjustment of the level of the radio-electric signals. This member could be constituted by a cursor, a button, a key, etc. In the embodiment shown in the single figure, the control member is a cursor movable along a guide path 2 between two end positions, this cursor being provided with motor means for automatic positioning, constituted by at least one motor member, such as an electric motor 3. Such a cursor plus motor block is for example sold by the company ALPS ELECTRIC Co. Ltd. under the reference RSA-0-9M12.

The mixing console also comprises means for detecting the instantaneous position of said adjustment member 1. In the example of the cursor above, the detection means are integrated in the form of a position detector directly in the cursor 1. The detected positions of the different cursors 1 are recorded within a position register shown in the single figure in the form of a "position" block.

The console also comprises memorization means for at least one position of said member corresponding to a mixing condition also called an adjustment position selected by the user. These memorization means are shown in the form of a "memory" block in the single figure.

In practice, one proceeds as follows. In the first instance, the user positions the assembly of the cursors 1 of the console in a predetermined position. Then, he memorizes all of the positions to define a first adjustment position in which with each cursor is associated a predetermined memorized position, which is a so-called reference position. The user if he wishes places the cursors in a second position which is again memorized. This memorization is shown by the arrows F1 and F2 disposed respectively between the "position" block and the "control computer" block, and the "control computer" and the "memory" block, in the single figure. There are thus defined several memory conditions corresponding to several adjustment positions also called mixing conditions. Each mixing condition is generally selected manually by the user. These selection means for a mixing condition are shown in the single figure by the "control computer" block and the program line between the "control computer" block and a "power" block, which will be described hereafter as well as by the arrows F2, F2' which permit updating the memories by inscribing in these latter position values of the adjustment members corresponding to the selected adjustment condition.

In this case, the operation of the console is as follows. The user selects manually for example an adjustment condition previously memorized by pressing a key. The control computer transmits this information to a "power" block which operates then in an automatic mode represented by MA in the single figure. This power block receives at its input a signal S representative of the distance between the instantaneous position of the control member and its memorized position corresponding to the control condition selected by the user. This signal S permits the "power" block to deliver to the motor 3 sufficient energy to move automatically the adjustment member 1 to its memorized position. Finally, the motor means for automatically positioning the adjustment member are constituted essentially by the motor member 3 which is subjected in operation to the signal S. In other words, the motor 3 drives in displacement the adjustment member 1 until the spacing between the memorized index position value and the value of the position of the adjustment member 1, will be zero.

When each adjustment member 1 is positioned at its position corresponding to the memorized predetermined position value, the so-called reference position, it may be necessary to proceed with manual adjustments which refine and/or modify the adjustment as memorized. To facilitate this adjustment and according to the object of the invention, each adjustment member is also provided with tactile means for signalling the spacing of said adjustment member relative to its predetermined memorized position.

In the embodiment shown in the single figure, the control console is characterized in that the tactile means for signalling the spacing of the adjustment member relative to its predetermined memorized position, comprise motor means for automatically positioning the adjustment member to its memorized position corresponding to an adjustment condition selected by the user. Thus, the tactile means are again constituted by the motor member 3 subjected in operation to a signal S representing the spacing between the instantaneous position of the adjustment member 1 and its predetermined memorized position corresponding to the condition of adjustment selected by the user. They moreover comprise the adjustment member 1 itself, which will supply tactile information sensible to the user by touch.

In other words, in this case, the tactile signalling means for the spacing of said adjustment member relative to its predetermined memorized position, and the motor means for automatically positioning the adjustment member to its memorized position corresponding to a condition of adjustment selected by the user, are constituted by at least one common motor member 3 acting on the adjustment member 1, the operation of this motor member 3 being subjected to a control signal S representative of a spacing between the predetermined memorized position of said adjustment member 1 and the instantaneous position of said adjustment member 1 to generate, a first so-called "automatic" operational mode, a motorized force sufficient to displace the adjustment member 1 to its memorized position and, in a second operating mode called "manual control", a memorization force detectable by the user by touch upon manual actuation of the adjustment member but insufficient to give rise to a displacement of this adjustment member.

To permit such operation of the console, the latter is provided with automatic switching means between the automatic operating mode MA and the so-called manual control operating mode MC, and means for manual switching between the operating mode called manual control MC and the operating mode called automatic MA. Thus, when the automatic positioning stage of the adjustment members 1 described above has been reached, the console is automatically switched into the so-called "manual control" operating mode.

As a result, the console is normally in the manual control mode represented by MC in the single figure. The switching between the two modes takes place in the "power" block. The switching means can be constituted by a simple throw. In this so-called "manually controlled" operating mode, the manual movement of the adjusting member 1 is adapted to give rise to a signal detectable by the user by touch. As a result, in this embodiment of operation, the "power" block is restrained such that it supplies to the motor member 3 an energy too low to drive the motor 3 but sufficient to give a tactile sensation, preferably as a function of the spacing between the real detected position of the cursor and the memorized predetermined reference position, namely generated by the adjustment member 1. The console could also be switched to a third entirely manual manner of operation, again called "free mode". In this case, the "power" block is totally blocked such that it does not supply the motor 3 with any energy, no matter what the value of the spacing between the instantaneous detected position of the adjustment member and a predetermined memorized position of said adjustment member.

As has been pointed out above, it will be noted that the control console comprises means subjected to a control signal S representative of a spacing between the instantaneous detected position of the adjustment member 1, and a predetermined memorized position of said adjustment member of the operation of the tactile means to signal the spacing of said adjustment member relative to its predetermined memorized position, and motor means for automatically positioning the adjustment member 1 to its memorized position corresponding to a condition of adjustment selected by the user.

In this particular embodiment of the invention in which the motor member is both an element of the tactile means and a motor means for automatically positioning the adjustment member, the subjected means constituted by the "memory" block, the "position" block and the "difference" block are common to the tactile means and to the motor means. There is thus obtained a control console of a particularly simple construction, little different in terms of its constituent members to a conventional console.

Automatic control is carried out in the following manner: from the value of instantaneous position detected for each cursor 1 by the position detector incorporated in said cursor 1 ("position" block) and from the reference position value memorized for each cursor ("memory" block), it is possible, in the "difference" block, to process these two values for each cursor, in particular by computation, to obtain a value representative of the spacing between said above values. From this value, there is generated a control signal S transmitted to the "power" block.

If there exists a spacing, namely if the position occupied by the cursor at the moment of its detection is not that corresponding to the memorized predetermined position, such as recorded in the "memory" block, the power signal permits supplying energy by the "power" block to the electric motor 3. This electric motor 3 is connected, by an endless transmission such as a belt, to the cursor 1. As a result, the electric motor is an electric member which, in this particular embodiment, constitutes both an actuating member for displacing said adjustment member and a member adapted to generate a tactile signal. This electric member generates for example, in the course of its operation, a force opposite the force exerted on each adjustment member 1 by the user. Obviously, this force is maintained below a predetermined threshold value, beyond which would be produced an automatic displacement of said adjustment member 1. Thus, the object is to carry out a manual displacement of this adjustment member 1 whilst generating, at the level of the adjustment member 1, a signal detectable to the touch of the user upon manual actuation of this adjustment member 1 beyond and/or on this side of said predetermined memorized position.

The force generated by said electric member can be a continuous or a progressive force, or respectively decreasing, increasing, or respectively diminishing, with the spacing between the real instantaneous position of the adjustment member and a memorized position. This depends on the processing carried out at the level of the control signal and/or of the adjustment of the "power" block. Thus, in the illustrated example, the antagonistic force increases as a function of the spacing of the cursor 1 relative to its predetermined memorized position. As a result, when the user places the cursor in its reference position corresponding to the predetermined memorized position, the spacing is zero and the restrained power source supplies no energy, which is the "slack point" of the cursor. If, on the contrary, the user moves the cursor, a low but detectable energy opposes this movement and renders the movement of the adjustment member all the more difficult the greater is the spacing relative to the reference point corresponding to the predetermined memorized position of the cursor. The operator can thus, thanks to this sensation detectable by touch, find very easily and rapidly the reference position or memorized reference position of said cursor.

It could also be provided that the force generated by the supplied electric motor be constant. There would then be given an all or nothing signal. Thus, there should be distinguished two cases, namely the case in which the adjustment member 1 occupies its predetermined memorized position. In this case, there will be noted an absence of emission of a tactile signal. In the other case, namely when the user will space the cursor 1 from this predetermined memorized position, there will be generated a constant tactile signal detectable by touch by the user. This solution is however not the preferred solution, the progressive solution being preferred.

As a result, the tactile signalling means can be of two types, either of the all or nothing type, or of the progressive type, or respectively diminishing type, the value of the tactile signal generated increasing or respectively decreasing with the spacing between the real instantaneous position of the adjusting member and a memorized position.

The embodiment of the console described above is the preferred embodiment of the invention. However, other embodiments of the invention can be envisaged.

Thus, in an embodiment which is not shown, the motor means for automatically positioning the adjustment member to its predetermined memorized position and the tactile means for signalling the spacing of said adjustment member relative to a predetermined memorized position of the control console, are different. In this case, the motor means for automatic positioning of the adjustment member can be provided in a manner analogous to that described above. The same is true for the means for subjecting the operation of the motor means and the tactile signalling means to a signal S representing the spacing between the instantaneous detected position of the adjustment member and a predetermined memorized position.

On the contrary, the tactile signalling means are constituted, in addition to an adjustment member, by an electric member whose supply of current is subject to a control signal representative of a spacing between the instantaneous detected position of the adjustment member and a predetermined memorized position of said adjustment member, this electric member generating on said adjustment member a signal detectable upon manual actuation of said adjustment member beyond and/or this side of said predetermined memorized position of said adjustment member. By signal, can be meant force, temperature variation, vibration, etc.

Thus, by way of example, the electric member could be constituted by a vibrating member, such as a vibrator, present for example in the form of a tablet disposed for example at the surface of said adjustment member when the latter is constituted by a cursor, a button or a key. This vibrator would be, in a manner analogous to that which has been described above, supplied in energy by the "power" block 4, for example, vibrating in a more or less intense manner as a function of the spacing of the cursor relative to its predetermined memorized position.

It could also be provided that this electrical member be constituted by a heating device reduced simply to an electric resistance which would be incorporated in said adjustment member 1. The manual displacement of said adjustment member in a direction spaced from its predetermined memorized position would generate for example an increase of the temperature of the cursor, indicating to the user that it is undergoing movement away from the predetermined memorized position. Again, the tactile signalling means could be of the all or nothing type or of the progressive type, or respectively decreasing, the value of the tactile signal generated increasing or respectively decreasing with the spacing between the real instantaneous position of the adjustment member and a predetermined memorized position of said adjustment member.

Thanks to the invention described above, the adjustment member could be very rapidly brought to its memorized position corresponding to the adjustment condition selected by the user, this adjustment being able to be immediately refined manually by the user without the latter having to look at the control console.

The control console could have multiple applications: lighting control console, mixing control console, etc.

What is claimed is:

1. Control console comprising at least one adjustment member selected from a group consisting of a cursor, a button, and a key for adjustment of a radio-electric signal level; said adjustment member being structured and arranged to be actuated manually by a user in order to occupy any position between two end positions; detection means for the instantaneous position of said adjustment member; and means for memorizing at least one position of said adjustment member corresponding to an adjustment position selected by the user;

wherein said adjustment member is provided both with motor means for automatic positioning of the adjustment member to its memorized position; and tactile means for emitting a signal representing the spacing of said adjustment member relative to its predetermined memorized position; the signal emitted by the tactile means being detectable to the touch of the user upon manual actuation of said adjustment member in either direction beyond said predetermined memorized position so as to recover very quickly the predetermined memorized position of the adjustment member without at the same time requiring the user to look at his console.

2. The control console according to claim 1, wherein the tactile means comprise motor means for automatically positioning the adjustment member to its memorized position.

3. The control console according to claim 1, further comprising means for subjecting the control signal S representative of spacing between the instantaneous detected position of the adjustment member and a predetermined memorized position of said adjustment member, the operation of the tactile means of the spacing of said adjustment member relative to its predetermined memorized position, and motor means for automatically positioning the adjustment member to its memorized position corresponding to an adjustment position selected by the user.

4. The control console according to claim 1, wherein the tactile means and the motor means are constituted by at least one common motor member acting on the adjustment member, the motor member being operational subject to a control signal S representative of the spacing between the predetermined memorized position of said adjustment member and the instantaneous position of said adjustment member to generate, in a first automatic operating mode MA, a motorized force sufficient to force the adjustment member to its memorized position, and in a second manual control mode MC, a motorizing force detectable by touch by the user upon manual actuation of the adjustment member, but insufficient to effect a displacement of said adjustment member.

5. The control console according to claim 1, wherein the motor means and the tactile means are different.

6. The control console according to claim 5, wherein the tactile means comprise, in addition to an adjustment member, an electric member whose current supply is subject to a control signal S representative of a spacing between the instantaneous detected position of the adjustment member and a predetermined memorized position of said adjustment member; said electric member generating on said adjustment member a signal detectable by touch by the user upon manual actuation of said adjustment member in either direction beyond said predetermined memorized position of said adjustment member.

7. The control console according to claim 1, wherein the tactile means emit a constant signal.

8. The control console according to claim 1, wherein the tactile means are progressive or respectively retrogressive, with the value of the tactile signal generated increasing or respectively decreasing with the spacing between the real instantaneous position of the adjustment member and a predetermined memorized position of said adjustment member.

9. The control console according to claim 6, wherein the electric member is a vibrating member or a heating device.

10. The control console according to claim 1, further comprising automatic switching means between an automatic operating mode MA and a manually controlled operating mode MC, and means for manually switching between the manually controlled mode MC and the automatic operating mode MA.

11. The control console according to claim 1, wherein the console is a mixing console.

* * * * *